US012798157B2

(12) United States Patent
Gorin et al.

(10) Patent No.: US 12,798,157 B2
(45) Date of Patent: Nov. 17, 2026

(54) AQUEOUS SEPARATION PROCESS FOR MULTIPLE POLYMER COMPONENTS

(71) Applicant: Dow Global Technologies LLC, Midland, MI (US)

(72) Inventors: Craig F. Gorin, Midland, MI (US); Jin Wang, Midland, MI (US); Scott T. Matteucci, Midland, MI (US); Jill M. Martin, Pearland, TX (US); En Wang, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 412 days.

(21) Appl. No.: 18/553,590

(22) PCT Filed: Jun. 17, 2022

(86) PCT No.: PCT/US2022/033940
§ 371 (c)(1),
(2) Date: Oct. 2, 2023

(87) PCT Pub. No.: WO2022/271539
PCT Pub. Date: Dec. 29, 2022

(65) Prior Publication Data

US 2024/0051187 A1 Feb. 15, 2024

Related U.S. Application Data

(60) Provisional application No. 63/213,424, filed on Jun. 22, 2021.

(51) Int. Cl.
*B29B 17/02* (2006.01)
*C08J 11/08* (2006.01)

(52) U.S. Cl.
CPC ............... *B29B 17/02* (2013.01); *C08J 11/08* (2013.01); *B29B 2017/0203* (2013.01); *B29B 2017/0244* (2013.01); *B29B 2017/0255* (2013.01); *B29B 2017/0293* (2013.01); *C08J 2323/06* (2013.01); *C08J 2333/24* (2013.01); *C08J 2367/02* (2013.01)

(58) Field of Classification Search
USPC .......................................................... 521/47
See application file for complete search history.

(56) References Cited

U.S. PATENT DOCUMENTS

| | | | | |
|---|---|---|---|---|
| 3,645,992 | A | | 2/1972 | Elston |
| 3,914,342 | A | | 10/1975 | Mitchell |
| 4,076,698 | A | | 2/1978 | Anderson et al. |
| 4,563,308 | A | | 1/1986 | Plantema et al. |
| 4,599,392 | A | | 7/1986 | McKinney et al. |
| 4,602,046 | A | | 7/1986 | Buser et al. |
| 4,746,422 | A | | 5/1988 | Grimm |
| 5,125,824 | A | | 6/1992 | Schaarschmidt |
| 5,183,212 | A | * | 2/1993 | Boo ........................ B03B 9/061 521/46.5 |
| 5,272,236 | A | | 12/1993 | Lai et al. |
| 5,278,272 | A | | 1/1994 | Lai et al. |
| 5,330,581 | A | | 7/1994 | Syrinek |
| 5,368,796 | A | | 11/1994 | Lorenz et al. |
| 5,582,923 | A | | 12/1996 | Kale et al. |
| 5,733,155 | A | | 3/1998 | Sagawa et al. |
| 5,767,230 | A | | 6/1998 | Scarola et al. |
| 5,854,045 | A | | 12/1998 | Fang et al. |
| 6,369,192 | B1 | | 4/2002 | Dufresne et al. |
| 6,555,588 | B2 | | 4/2003 | Gorski et al. |
| 7,462,685 | B2 | | 12/2008 | Bohnert et al. |
| 9,028,734 | B2 | | 5/2015 | Hallaji |
| 9,695,259 | B2 | | 7/2017 | Layman et al. |
| 9,803,035 | B2 | | 10/2017 | Layman et al. |
| 9,808,963 | B2 | | 11/2017 | Feichtinger et al. |
| 10,189,970 | B2 | | 1/2019 | Viot et al. |
| 11,597,826 | B2 | | 3/2023 | Hara et al. |
| 2015/0267028 | A1 | | 9/2015 | Viot et al. |
| 2017/0002115 | A1 | | 1/2017 | Layman et al. |
| 2019/0193303 | A1 | | 6/2019 | Heyde et al. |
| 2019/0330439 | A1 | | 10/2019 | Siegl et al. |

FOREIGN PATENT DOCUMENTS

| | | | | | |
|---|---|---|---|---|---|
| EP | 0102122 | | | 3/1984 | |
| EP | 0714918 | | | 6/1996 | |
| EP | 0714918 | B1 | * | 2/1999 | ............. B29C 48/05 |
| EP | 2789646 | | | 10/2014 | |
| EP | 3674361 | | | 7/2020 | |
| JP | 2007039645 | A | * | 2/2007 | |
| WO | 2019083873 | | | 5/2019 | |
| WO | 2019083877 | | | 5/2019 | |
| WO | 2019182893 | | | 9/2019 | |
| WO | 2019229235 | | | 12/2019 | |
| WO | 2019234511 | | | 12/2019 | |
| WO | 2020043320 | | | 3/2020 | |
| WO | 2020058679 | | | 3/2020 | |

OTHER PUBLICATIONS

JP2007039645 Machine Translation (Year: 2007).*

* cited by examiner

*Primary Examiner* — Terressa Boykin

(57) ABSTRACT

A process for separating and recovering at least one polymer component from a melt of a multiple number of polymer components, including the steps of: (A) shearing a multi-polymer component melt in the presence of a pressurized aqueous solution comprising an aqueous liquid mixture of (i) water, and (ii) at least one dispersing agent; and wherein the multi-polymer component melt comprises a blend of at least a first polymer component and at least a second polymer component, each as described herein; and wherein the shearing of the multi-polymer component melt, in contact with the pressurized aqueous solution, forms a dispersion, particles, or strands of the at least one first polymer component having an enriched first polymer component concentration; and (B) after the shearing of step (A), isolating the at least first polymer component by separating the dispersion, particles, or strands.

20 Claims, 1 Drawing Sheet

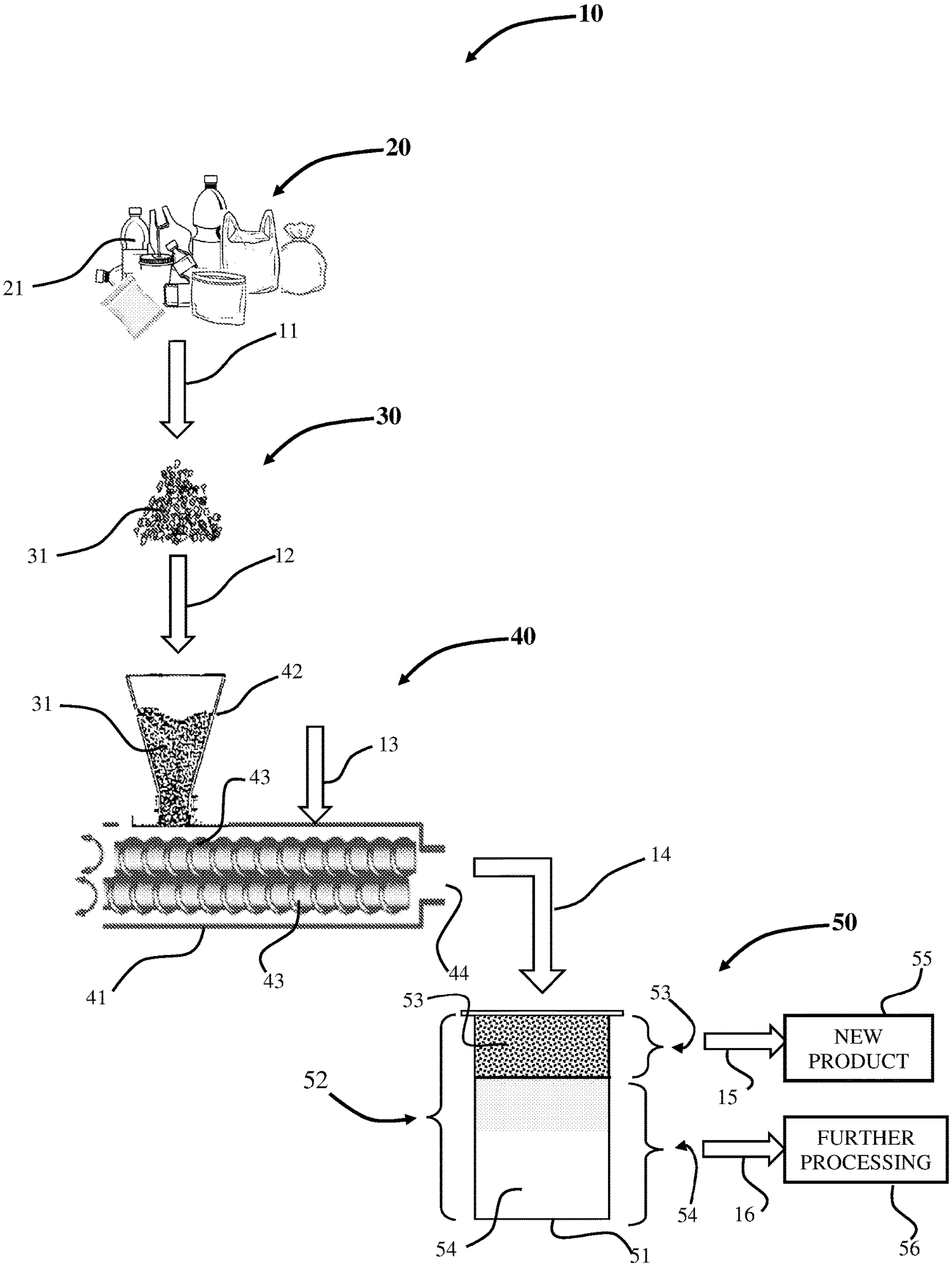
10
20
21
11
30
31
12
40
42
31
13
43
14
44
41
43
50
55
53
53
NEW
PRODUCT
15
52
FURTHER
PROCESSING
54
16
54
51
56

AQUEOUS SEPARATION PROCESS FOR MULTIPLE POLYMER COMPONENTS

FIELD

The present invention relates to an aqueous process for separating at least one separate and distinct single-polymer component stream from a melted mixed polymer stream having a mixture of multiple polymer components. The aqueous process enables recycling the at least one separate and distinct single-polymer component stream which is separated from the melted mixed polymer stream.

BACKGROUND

In an effort to reduce the amount of plastic waste generated in the environment, it is desired to re-use (recycle) plastic articles such as post-consumer disposable plastic products including, for example, multilayer packaging and films which are commonly applied in single-use applications and thereafter disposed of. Typically, a mixture of incompatible polymer components is present in the disposable products because the disposable products are usually fabricated from materials that comprise a combination of different types of incompatible polymer components. The incompatible polymer components are combined together, for example, by compounding the different polymer components together to form a blend of components; or by combining (e.g., by laminating) two or more layers of different polymer components together to form a multilayer system.

Generally, an article is made from multiple different polymer components to enable the article to meet specific application requirements. However, the problem with articles and disposable products made from multiple polymer components is that such multi-component polymer articles/products are usually undesirable for recycling because such multi-component polymer articles/products generate a mixed stream of different incompatible polymer components which makes the mixed stream difficult to re-use in new applications. Also, it is difficult to separate a desired single-polymer component stream from the incompatible mixed polymer component stream. For example, when a blend or mixture of different polymers is used to fabricate an article incorporating the mixture of different polymers, such as a multilayer packaging or a multilayer film; such article typically cannot be directly recycled due to the incompatibility of the different polymers making up the article. To employ an effective recycling method to achieve reusing articles (e.g., multilayer packaging/films) made from a blend of different polymer components, the blend of polymer components of the articles should be separated into one or more separate single-polymer component streams; then the desired single-polymer component stream can be separated from the other non-desired blend of polymer components in the stream. Once the desired single-polymer component stream is separated from the mixed polymer stream, the desired single-polymer component stream can be recovered for re-use (recycling).

It would be an advantage to the recycling industry to be able to take a disposable article or product (e.g., packaging or film) made of incompatible polymer components and separate the incompatible polymer components into separate and distinct single-component polymer streams to make it easier to recover the desired single-component polymer stream for recycling. It is therefore desired to provide an effective separation and recovery process including the step of shearing a melted flowable liquid composition of a mixture (blend) of multiple different incompatible polymer components (sourced, for example, from one or more thermoplastic polymer articles) to separate the mixture or blend of different polymer components into separate single-component polymer streams; and then recovering, from the blend of different polymer components, the desired separated single-polymer component stream having an enriched single-polymer component to enable recyclers to reuse the recovered enriched single-polymer component stream in a new applications.

SUMMARY

The present invention process provides a solution to the problem of the prior art processes by enabling the isolation of a desired polymer component stream, such as a PE stream, from a composition of mixed polymer components. Accordingly, the present invention disclosed herein is directed to a novel effective process for separating and recovering one or more separate and individual single-polymer component streams from a molten material (or melt) comprising a melted mixture of at least two or more different incompatible polymer component streams. The melt is generated from processing a thermoplastic source. For example, the thermoplastic source can be a thermoplastic article or a plurality of thermoplastic articles (e.g., a laminate, composite, film or packaging material); wherein the thermoplastic source includes a mixture, blend or combination of multiple (e.g., two or more) polymer components (herein referred to as "multi-polymer components" or abbreviated "multi-PC"); and wherein the multi-PC of the thermoplastic source are typically incompatible.

The thermoplastic source is subjected to heating/melting to form a melt of the multi-PC; and then the multi-PC melt is subjected to the above novel process to generate at least one separate single-polymer component stream for recovery and subsequent use. Thus, one embodiment for solving the incompatibility problem encountered using the prior art processes is to use the above novel separation/recovery process which includes, for example, the step of shearing the multi-PC melt in the presence of a separation fluid such as an aqueous separation fluid liquid solution which is pressurized to maintain the aqueous solution in liquid form. Shearing the formulation or composition of the blend, admixture, combination, or mixture of: (I) at least the multi-PC melt and (II) at least the aqueous solution (herein abbreviated as the "MAS mixture") forms at least one desired separate single-polymer component stream that can be readily separated from the other polymer components present in the multi-PC melt.

In one embodiment, the process for separating and recovering at least one single-polymer component from a multi-PC melt (which, as described above, has been sourced from one or more thermoplastic articles) having a mixture of multiple different polymer components includes the steps of: (A) shearing the MAS mixture (i.e., shearing the mixture comprising the multi-PC melt and aqueous solution); wherein the multi-PC melt comprises at least one first polymer component and at least one second polymer component; wherein the multi-PC melt has two or more thermal melting temperatures (Tm), two or more glass transition (Tg) temperatures, or combinations thereof; wherein the pressurized aqueous solution comprises an aqueous liquid mixture of: (i) water, and (ii) at least one dispersing agent; wherein the shearing of the MAS mixture forms a dispersion, particles, or strands of the at least one first polymer component having an enriched first polymer component concentration; and (B) after the shearing of step (A), separating the dispersion, particles, or strands of the at least one first polymer component having an enriched first polymer component concentration, from the other components of the melt (e.g., the water, the at least one dispersing agent, the at least second polymer component, and any remaining thermoplastic polymer resin components and/or optional components).

In another embodiment, the process for separating and recovering at least one single-polymer component stream having a polymer-enriched concentration of the single-polymer component from a multi-PC melt stream having a mixture of multiple (e.g., two or more) different polymer components includes the steps of: (a) providing at least one multi-PC thermoplastic article or a combination of two or more thermoplastic articles comprising at least a first polymer component and at least a second polymer component; (b) melting the multi-PC thermoplastic article or the combination of two or more thermoplastic articles to form a flowable liquid multi-PC melt stream; wherein the multi-PC melt stream comprises a blend or mixture of at least one first polymer component melt stream and at least one second polymer component melt stream; wherein the multi-PC melt stream exhibits two or more peaks in the multi-PC melt stream's second heat cycle using differential scanning calorimetry; (c) providing a pressurized aqueous solution; wherein the aqueous solution comprises an aqueous liquid fluid solution mixture of: (i) water, and (ii) at least one dispersing agent; (e.g., an ethylene oxide (EO)/propylene oxide (PO) blend or an ethylene copolymer); wherein the pressure on the aqueous solution is sufficient to maintain the aqueous solution in liquid phase at a use temperature; (d) admixing the pressurized aqueous solution of step (c) with the multi-PC melt of step (b) to form the MAS mixture; (e) shearing the MAS mixture of step (d) (i.e., the mixture of (I) the multi-PC melt of step (b) in contact with (II) the pressurized aqueous solution of step (c)); wherein shearing the MAS mixture forms a dispersion, particles, or strands of the at least one first polymer component stream having an enriched first polymer component concentration; (f) after the shearing of step (e), separating (e.g., by mechanical or physical means) the dispersion, particles or strands of the at least one first polymer component having an enriched first polymer concentration from the other components present in the MAS mixture (e.g., the water, the at least one dispersing agent, the at least second polymer component, any remaining thermoplastic polymer resin components of the multi-PC melt, and/or any optional components); and (g) recovering the separated dispersion, particles or strands of step (f).

An objective is to provide a novel and effective separation/recovery process for separating at least one separate single-polymer component from multiple polymer components present in a multi-PC melt; and recovering the separated single-polymer component to enable effectively recycling the recovered separated single-polymer component.

BRIEF DESCRIPTION OF THE DRAWINGS

FIG. 1 is a schematic flow diagram showing one embodiment of the process of the present invention.

DETAILED DESCRIPTION

"Room temperature (RT)" and "ambient temperature" herein means a temperature between 20 degrees Celsius (° C.) and 26° C., unless specified otherwise.

The terms "melted", "melt", and "molten" with reference to a polymer resin are used herein interchangeably.

The term "thermal transition", with reference to a polymer resin, herein means melt or melting temperature (Tm) and/or glass transition temperature (Tg).

The term "second heat cycle" herein refers to the heating operation of a DSC after a first heat cycle where a sample is heated from ambient conditions to above a temperature where the sample is in its melt state and then the sample is cooled to below its thermal transitions.

A broad embodiment of the present invention process includes processing a thermoplastic article or combination of two or more thermoplastic articles wherein each of the articles can be constructed of a multiple number (e.g., at least two or more) of thermoplastic polymer components. The process includes separating and recovering at least one of the thermoplastic polymer components from the multiple number of thermoplastic polymer components present in one or more of the thermoplastic articles.

In one embodiment, the thermoplastic article(s) comprise a blend, combination, composite, or mixture of multiple (for example, two or more) polymer components (herein referred to as "multi-polymer components" or abbreviated "multi-PC" as aforementioned). Typically, the multi-PC of the articles are incompatible. The article or combination of two or more articles made of at least two or more thermoplastic polymer components are melted to form a multi-PC melt. Then, the multi-PC melt is contacted and treated with a separation fluid (e.g., an aqueous separation liquid solution) comprising a mixture of (i) water and (ii) at least one dispersing agent. Then, the multi-PC melt in the presence of the aqueous solution is subject to shearing to separate the multiple polymer components of the article into separate single-polymer component streams; and then recovering the desired separated one or more single-polymer component streams from all other polymer component streams created during the shearing process described above. In some embodiments, the process enables recycling of the recovered desired separated single-polymer component streams.

In one preferred embodiment, the process for separating and recovering at least one single-polymer component from an article constructed of a multiple number of polymer components includes the steps of: (a) providing at least one multi-PC thermoplastic article having at least one first polymer component and at least one second polymer component; (b) melting the at least one multi-PC thermoplastic article to form a melted or molten multi-PC article (herein referred to as a "multi-PC melt"); wherein the resultant multi-PC melt, sourced from the at least one multi-PC article, comprises a blend of at least one first polymer component melt stream and at least one second polymer component melt stream; wherein the multi-PC melt exhibits two or more peaks in the melt's second heat cycle using differential scanning calorimetry; (c) providing an aqueous solution, under a predetermined pressure, including a pressurized aqueous liquid mixture of: (i) water, and (ii) at least one dispersing agent; (d) adding the multi-PC melt of step (b) to the pressurized aqueous liquid solution of step (c) to form a formulation or composition mixture of (I) the aqueous solution and (II) the multi-PC melt (i.e., the "MAS mixture"); (e) shearing the MAS mixture to form, in the MAS mixture, a dispersion, particles, or strands of the at least one first polymer component stream having an enriched first polymer component concentration; (f) after the shearing of step (e), separating the dispersion, particles or strands of the at least one first polymer component stream having an enriched first polymer component concentration from the other components present in the MAS mixture (e.g., the water, the at least one dispersing agent, the at least second polymer component, any remaining thermoplastic polymer resin components of the multi-PC melt, and/or any optional components in the MAS mixture); and (g) recovering the separated dispersion, particles or strands of step (f).

In some preferred embodiments, the process includes, for example, a shearing of step (e) occurring at a temperature of from 105° C. to 300° C.; a shearing of step (e) occurring at a gauge pressure of at least 100 kilopascals (kPa); and a shearing of step (e) occurring for a period of time of less than 20 minutes (min).

In one preferred embodiment of the process the separating of step (f) can comprise a floatation process, a filtration process, or a flocculation process.

In one preferred embodiment of the process, the first polymer component of the melt is a polyolefin component; and the polyolefin component is selected from the group consisting of high density polyethylene; low density polyethylene; linear low density polyethylene; ethylene copolymers; or mixtures thereof.

With reference to FIG. 1, there is shown a flow diagram, indicated generally by reference numeral 10, of one embodiment of the present invention process including flow streams indicated by numerals 11-16. For example, the first step of the process shown in FIG. 1, indicated generally by reference numeral 20, begins with a thermoplastic material which can include a group or combination of one or more thermoplastic polymer articles 21 to be subjected to the process. The articles 21 comprise, and constructed of, a blend or mixture of multiple polymer components in the article's 21 structure. The articles 21 can be rigid articles, flexible articles, and mixtures thereof.

The articles 21 are passed to a densifying step, indicated generally by reference numeral 30, via stream 11. The densifying step 30 can be carried out using any conventional equipment to convert the articles 21 to a plurality of smaller pieces 31, i.e., the pieces 31 are smaller compared to the size of the original source of thermoplastic material (e.g., articles 21). For example, the densifying step 30 can form the pieces 31 by grinding (not shown) the articles 21 to form flakes 31. Other embodiments of the densifying step 30 can include for example shredding (not shown) articles 21 to form shredded pieces (not shown); pelletizing (not shown) the articles 21 to form pellets (not shown); and/or comminuting (not shown) the articles 21 to form a powder (not shown). In some embodiments, the size of the flakes 31 can be, for example, less than 200 microns (μm).

As shown in FIG. 1 again, the flakes 31 are passed, via stream 12, to an extrusion step generally indicated by reference numeral 40 including an extruder 41 and feed hopper 42. The extruder 41 is a twin-screw extruder 41, however the extruder 41 can include a single screw extruder or other types of extruders. Although not shown in FIG. 1, various elements and ancillary pieces of equipment can be included in the extrusion operation 40; for example, the extruder 41 can include one or more heating/cooling elements, one or more feed ports, one or more pumps and other conventional equipment known to a person skilled in the art of extrusion. The flakes 31 in solid form are passed, via stream 12, into the feed hopper 42 of the extruder 41; and then the solid flakes 31 are passed through a heating zone inside of the extruder 41 by the screws 43. The flakes 31 are passed through the heating zone to melt the flakes 31 and form a flowable liquid melt (not shown) that exits the extruder's exit port 44.

To continue the process, as shown in FIG. 1, the melt (sourced by melting one or more melted articles 21) in the form of a molten stream (or melt) is formed in a heating zone (not shown) in the extruder 41. A stream 13 of aqueous solution (i.e., the aqueous separation fluid liquid solution) is introduced into the extruder 41, maintained under a predetermined pressure, and mixed with the melted flake stream in the extruder 41 to form a MAS mixture exiting the extruder 41 as stream 14 form the exit port 44 of the extruder 41. The aqueous solution stream 13 can be introduced into the extruder 41 through a feed port (not shown) before or ahead of the flake stream 12; after or subsequent to the flake stream 12 (as shown in FIG. 1); concurrently with the flake stream 12; and/or before or after the molten flake stream is formed in the heating zone of the extruder 41.

The MAS mixture (i.e., the combined aqueous solution and multi-PC melt) is passed, via stream 14, to a separation step generally indicated by reference numeral 50. The separation step 50 can include various conventional mechanical separation processes known to those skilled in the art including for example, and not to be limited thereby, a floatation process, a filtration process, a flocculation, or a combination thereof. In FIG. 1, there is shown one embodiment of a separation process 50 which includes, but is not limited thereto, a floatation process 50 in which the MAS mixture stream 14 undergoes separation by floatation in a vessel 51. In the floatation separation step 50, the mixture of multiple types of polymer components in the multi-PC melt which are present in the MAS mixture as polymer component streams are separated into at least one or more single-polymer component streams which are distinct polymer component streams of each of the types of polymers present in the multi-PC melt.

FIG. 1 shows that the MAS mixture, generally indicated by reference numeral 52, from stream 14 has separated into two distinct layers—a desired plurality of solids layer 53 and an undesired liquid layer 54 in vessel 51. The desired solids layer 53 comprises a desired layer of a plurality of floatable solids component which is separated and removed from the other components in the MAS mixture. For example, the desired solids layer may include dispersion of particles; a plurality of micron size particles, flakes, or pellets; or a plurality of strands of at least one single-polymer component which separates from the other components in the MAS mixture. The undesired liquid layer 54 may also contain solids which are not floatable and are undesired. In one embodiment, for example, the solids (e.g., PE particles) which forms the solids layer 53 float to the top of the liquid solution layer 54 to form the desired plurality of solids (e.g., a multitude of particles) layer 53.

After the separation step 50, the particles layer 53 is recovered and can be recycled (reused) by passing the particles 53 via stream 15 to a recycling system (not shown) to form a new product 55. In some embodiments, the new product 55 can be, for example, an article similar to the original article 21 (e.g., such as a bottle container, a film or packaging article) or the new product can be some other article different from article 21. Alternatively, the particle layer 53 can be sent to a different processing step such as a drying step before the particles 53 are used. The liquid solution layer 54 may comprise the residue or tailings of the multi-PC melt after treating the melt with the aqueous liquid solution during the shearing step (e). After the separation step 50, the liquid layer 54 can be recovered and sent, via stream 16, to another processing step 56 such as a recovery step to recover other components in the liquid phase 54 or the liquid 54 can be discarded if desired.

To illustrate the present invention process, and not to be limited thereby, in one embodiment for example, an article or mixture of articles, such as a plastic bottle container(s) or mixture of different articles such as plastic rigid bottles and plastic flexible bags (see article 21) made from multiple polymer components such as a polypropylene (PP) and polyethylene (PE) blend, can be separated into a PP stream and a PE stream using the separation process 50. In other embodiments, the separation process 50 is used to produce at least one stream (e.g., stream 14) of a single-polymer component having an enriched concentration of the single-polymer component in the stream. In a preferred embodiment, for example, the PE polymer component stream (layer 53) having an enriched concentration of PE in the stream can be passed (e.g., via stream 15 of FIG. 1) to a recycling system to enable the recycle (re-use) of such single polymer-enriched component stream.

The multi-PC melt comprises a mixture or blend of melted multiple polymer components; and the melt is useful as a feed stream to the shearing step (see the shearing operation 40 of FIG. 1) of the process described above. The multi-PC melt can be a mixture of at least two or more polymer components, i.e., at least one first polymer component and at least one second polymer component; wherein at least one of the first or second polymer components (e.g., the at least one first polymer component) can be melted and reformed into a new or different article. In a preferred embodiment, the first and second polymer components are polymer components that do not co-crystallize, i.e., no co-crystallization occurs between the desired polymer component and any other polymer component. The terms "crystallize", "crystallization", "crystallizing" and "co-crystallization", with reference to a polymer, herein means forming an ordered domain upon solidifying from a melted phase. Co-crystallization can be determined using differential scanning calorimetry (DSC) and co-crystallization can be readily identified if multiple melting temperature or glass transition temperature events can be observed, or not, using DSC. For example, if a single melting peak is observed for a molten material, the molten material can be considered co-crystallized. In another example, if two melting peaks are observed for a molten material, the molten material can be considered non-co-crystallized.

In some embodiments, the multi-PC melt feed stream into the shearing step of the process comprises, for example, the at least one first polymer component; and in one preferred embodiment, the at least one first polymer component is a polymer component that is capable of being melted and reformed. The first polymer component of the melt can be selected, for example, from the group including polyolefins; acrylics; styrenic polymers; styrene copolymers; polyamides; thermoplastic urethanes; thermoplastic silicones; and combination thereof.

Examples of polyolefins useful in the process include ethylene polymers and copolymers; and propylene polymers and copolymers. Particularly useful in the process include polyolefins such as a high density polyethylene (HDPE), a low density polyethylene (LDPE), a linear low density polyethylene (LLDPE), a medium density polyethylene (MDPE), an ultra-low density polyethylene (ULDPE), a PP, copolymers of ethylene with another monomer, copolymers of propylene with another monomer, and mixtures thereof; and the like.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 pounds per square inch (psi) (100 megapascals [MPa]) with the use of free-radical initiators, such as peroxides (e.g., see U.S. Pat. No. 4,599,392). LDPE resins typically have a density in the range of 0.916 grams per cubic centimeter (g/cm$^3$) to 0.935 g/cm$^3$.

The term "LLDPE", includes resins made using the traditional Ziegler-Natta catalyst systems and resins made using the chromium-based catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined, for example, in U.S. Pat. Nos. 5,272,236; 5,278,272; 5,582,923; and 5,733,155; the homogeneously branched linear ethylene polymer compositions such as those described in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 and 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 g/cm$^3$ to 0.935 g/cm$^3$. "MDPEs" are typically made using chromium or Ziegler-Natta catalysts or using single-site catalysts including, but not limited to, bis-metallocene catalysts and constrained geometry catalysts; and MDPEs typically have a molecular weight distribution ("MWD") of greater than (>) 2.5.

The term "HDPE" refers to polyethylenes having densities greater than 0.935 g/cm$^3$ and up to 0.970 g/cm$^3$; and which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 g/cm$^3$ to 0.912 g/cm$^3$; and which are generally prepared with Ziegler-Natta catalysts, chrome catalysts, or single-site catalysts including, but not limited to, bis-metallocene catalysts and constrained geometry catalysts.

The term "PP" refers to polypropylene polymers comprising greater than 50% by weight of units which have been derived from a propylene monomer. Such polymers include polypropylene homopolymers or copolymers (meaning units derived from two or more comonomers). Common forms of polypropylene known in the art include homopolymer polypropylene (hPP), random copolymer polypropylene (rcPP), impact copolymer polypropylene (hPP+at least one elastomeric impact modifier) (ICPP) or high impact polypropylene (HIPP), high melt strength polypropylene (HMS-PP), isotactic polypropylene (iPP), syndiotactic polypropylene (sPP), and combinations thereof.

In some preferred embodiments, the first polymer component present in the multi-PC melt feed stream is a polyolefin or polyolefin copolymer. In other preferred embodiments, the polyolefin component is selected from the group consisting of: HDPE, LDPE, LLDPE, ethylene copolymers, or mixtures thereof. In still other preferred embodiments, polymers useful as the first polymer component in the process are polymer materials having a melt index of from 0.5 grams per 10 minutes (g/10 min) to 80 g/10 min; and a melting temperature of from 60° C. to 150° C.

In other embodiments, the first polymer component present in the multi-PC melt feed stream can include commercially available polyolefins or polyolefin copolymers such as VERSIFY (a random copolymer available from The Dow Chemical Company); INTUNE (a block copolymer also available from The Dow Chemical Company); and mixtures thereof.

In some embodiments, the second polymer component present in the multi-PC melt feed stream can be selected from other polymers having a melt index of from 0.5 g/10 min to 400 g/10 min; and a melting temperature greater than the first polymer component material. For example, the second polymer component can include polyesters, polyethylene terephthalate, polyamides, metallized forms of oriented films such as metallized-PET film or metallized-PP film, PP, and mixtures thereof.

Some of the preferred multiple polymer blends or polymer combinations used as the multi-PC melt feed stream in the process may include, for example, polypropylene/polyethylene (PP/PE), polyethylene terephthalate/polyethylene (PET/PE), oriented metallized-polyethylene terephthalate film/polyethylene (m-PET/PE); polyamide/polyethylene (PA/PE), and mixtures thereof.

In some embodiments, the multiple polymer blends or polymer combinations used as the multi-PC melt feed stream in the process can be sourced from post-consumer products or post-industrial recycled products.

The process for separating and recovering polymer components from the multi-PC melt includes the step of providing an aqueous separation fluid solution (herein abbreviated "aqueous solution") that can be pressurized at a pressure sufficient to maintain the aqueous solution in liquid form. In one embodiment, the aqueous solution includes an aqueous liquid mixture of: (i) water, and (ii) at least one dispersing agent; and (iii) any other optional additive or component as desired. The optional desired additives, are additives that can more easily enable formation, in the aqueous solution, of a dispersion, particles or strands of the at least one first polymer component, such as PE, wherein the resultant first polymer component stream has an enriched first polymer component (e.g., PE) concentration.

In one preferred embodiment, the water used in the aqueous solution of the process can be water from any source including, for example, deionized water. The water acts as a diluent in the aqueous solution.

The amount of the water used to form the aqueous solution is from 50 wt % to 99.9 wt % in one general embodiment; from 65 wt % to 99.5 wt % in another embodiment; and from 85 wt % to 97.5 wt % in still another embodiment.

In one embodiment, the aqueous solution includes at least one dispersing agent (may also be referred to as a surfactant), component (ii). The dispersing agent can include, for example, an ethylene oxide (EO)/propylene oxide (PO) blend; an ethylene copolymer; other conventional dispersing agents known in the art; and mixtures thereof.

The dispersing agent useful in the process can be conventional dispersing agents used in the art for polymer dispersions. For example, the dispersing agent can comprise at least one carboxylic acid, a salt of at least one carboxylic acid, or carboxylic acid ester or salt of the carboxylic acid ester. The carboxylic acid, the salt of the carboxylic acid, or the carboxylic acid portion of the carboxylic acid ester or the salt of such ester can have up to 60 carbon atoms (C), or up to 50 C, or up to 40 C, or up to 30 C, or up to 25 C. The carboxylic acid, the salt of the carboxylic acid, or the carboxylic acid portion of the carboxylic acid ester or the salt of such ester can have at least 12 C, at least or at least 15 C, or at least 20 C, or at least 25 C. If in salt form, the dispersing agent comprise a cation selected from the group consisting of an alkali metal cation, alkaline earth metal cation, or ammonium or alkyl ammonium cation. The dispersing agent can be an olefin (e.g., ethylene) carboxylic acid polymer, or its salt, such as ethylene acrylic acid copolymers or ethylene methacrylic acid copolymers. Alternatively, the dispersing agent can be selected from alkyl ether carboxylates, petroleum sulfonates, sulfonated polyoxyethylenated alcohol, sulfated or phosphated polyoxyethylenated alcohols, polymeric ethylene oxide/propylene oxide dispersing agents, primary and secondary alcohol ethoxylates, alkyl glycosides and alkyl glycerides. Combinations of the above dispersing agents can also be used.

The amount of the dispersing agent (or combinations of more than one dispersing agent) used to form the aqueous solution is from 0.1 wt % to 35 wt % in one general embodiment; from 0.5 wt % to 25 wt % in another embodiment; and from 3 wt % to 10 wt % in still another embodiment.

The dispersing agent (or combinations of more than one dispersing agent) is used in amounts of at least 0.1 wt %, or at least 1 wt %, or at least 2 wt %, or at least 3 wt % up to 35 wt %, or up to 30 wt %, or up to 20 wt %, or up to 10 wt % based on the total weight of any contaminated thermoplastic, dispersing agent and any optional components (i.e., weight of combination excluding water).

Although the aqueous solution, in one general embodiment, includes the two components (i) and (ii), the aqueous solution may be formulated with a wide variety of optional additives to enable performance of specific functions while maintaining the excellent benefits/properties/performance of the aqueous solution. The optional component(s), component (iii), may be added to component (i) of the aqueous solution; or the optional component(s) may be added to component (ii) of the aqueous solution; or the optional component(s) may be added to both components (i) and (ii) of the aqueous solution. For example, in one embodiment, the optional additives, component (iii), useful in the aqueous solution may include enzymes, catalysts, other different surfactants or dispersing agents than those described above, pH modifiers, compatibilizers, and mixtures thereof.

For example, in one embodiment, the optional other surfactants that can be used in the process can be any conventional surfactant known in the art including cationic, nonionic, anionic, and mixtures thereof. The concentration of the optional surfactant can be from 0 wt % to 30 wt % in one general embodiment; and from 0.05 wt % to 30 wt % in another embodiment. In a preferred embodiment, the concentration of the optional surfactant can be toward the lower end of the general concentration range to prevent additional impact to the final mechanical properties of the desired manufactured product.

A compatibilizer can be used in addition to the dispersing agent. For example, when nonionic dispersing agents, such as the ethylene oxide/propylene oxide copolymers, are used an additional compatibilizer can be particularly desirable. A compatibilizer can also be used in combination with anionic or cationic dispersing agents.

The compatibilizer can improve compatibility between the dispersing agent and the thermoplastic. The compatibilizer can be, for example, an acid functionalized wax. The compatibilizer will generally have a lower amount of acid functionality than the dispersing agent—or stated alternatively, a higher acid equivalent weight. The compatibilizer can have an acid number of 10 to 70. "Acid number" is the number of milligrams of potassium hydroxide required for neutralization of the free acid present in one gram of the material (in this case the compatibilizer). The compatibilizer can have a melt index of 500 g/10 min to 5,000,000 g/10 min at 190° C. with 2.16 kilograms (kg) load. Non-limiting examples of the compatibilizer include acid-functional modified polyolefin wax, maleic anhydride polyolefin copolymer wax, maleic anhydride modified polyethylene wax, maleic-anhydride modified polypropylene wax, and mixtures thereof. A commercial example of a compatibilizer includes: LICOCENE™ 431 stabilized maleic anhydride grafted polyethylene wax (sometimes referred to as MA-g-PE), available from Clariant Corporation. The amount of the optional compatibilizer can be 0 wt %, or 0.5 wt % up to 15 wt % or up to 10 wt % based on total weight of the contaminated thermoplastic, dispersing agent and compatibilizer and any other optional components (i.e., weight of combination excluding water).

With certain dispersing agents or compatibilizers, it can be desirable to include a neutralizer to improve the effectiveness of the dispersing agent. For example, a base, such as a metal hydroxide (e.g., KOH) can be added. The amount of neutralizing agent or base can be 60 percent (%) to 120% based on cumulative acid number of the dispersing agent and any compatibilizer.

In a general embodiment, the amount of the other optional additives, component (iii), useful for adding to the aqueous solution can be generally in the range of from 0 wt % to 5 wt % in one embodiment; from 0.01 wt % to 2.5 wt % in another embodiment; and from 1 wt % to 1.5 wt % in still another embodiment based on the total weight of the components in the pressurized aqueous solution.

The aqueous liquid solution used in the process has several advantageous properties and benefits when used to treat the thermoplastic polymers used in the process. For example, the aqueous liquid solution enables reduced interfacial tension of the polymer and water phases to enable dispersion.

The process includes a melting step for melting the at least one multi-PC thermoplastic article under process conditions to form a melted or molten multi-PC article (described above as a "multi-PC melt") prior to combining the multi-PC melt with the aqueous solution; and prior to the shearing and separating steps. In some embodiments, the temperature used is, for example, sufficient to convert the multi-PC thermoplastic articles into a melt. In other embodiments, for example, the temperature used to form the multi-PC melt can be from above the melt temperature of at least the first polymer component of the multi-PC melt up to 280° C. depending upon the first polymer component. In a preferred embodiment, the melting temperature should be maintained below a temperature at which degradation of the multi-PC melt may occur. For example, the melting point (MP) temperature of the first polymer component in the multi-PC melt feed stream can be up to a temperature of 300° C. In some embodiments, the MP temperature of the first polymer component can be from 40° C. to 250° C. in one embodiment; from 90° C. to 190° C. in another embodiment; and from 110° C. to 140° C. in still another embodiment. Thus, in some embodiments, the melting temperature used in the process can be, for example, at least 105° C., or at least 110° C., or at least 130° C., or at least 150° C., or at least 160° C. up to 300° C., or up to 280° C., or up to 250° C., or up to 240° C., or up to 230° C., or up to 220° C., or up to 210° C., or up to 200° C.

The process includes an addition step, for example step (d) of the process described above. In the addition step, the aqueous liquid solution can be added to the multi-PC melt in concentrations and under process conditions sufficient to form a formulation or composition mixture of: (I) at least the aqueous solution and (II) at least the multi-PC melt (i.e., the "MAS mixture" described above). The addition step may be carried out prior to the shearing and separating steps. Also, in some embodiments, the aqueous solution is added to the multi-PC melt under process conditions to maintain the MAS mixture in a flowable liquid form. The temperature of the addition step can be the same as the melting temperature described above. Accordingly, in some embodiments, the temperature used during the addition step can be, for example, at least 105° C., or at least 110° C., or at least 130° C., or at least 150° C., or at least 160° C. up to 300° C., or up to 280° C., or up to 250° C., or up to 240° C., or up to 230° C., or up to 220° C., or up to 210° C., or up to 200° C.

In a preferred embodiment, the aqueous solution is pressurized to maintain the aqueous solution in liquid form. In some embodiment, for example, the pressure applied to the aqueous solution during the addition step can be at least 15 pounds per square inch (psig), or at least 20 psig, or at least 50 psig, or at least 80 psig, or at least 100 psig, or at least 150 psig, or at least 200 psig up to 1000 psig, or up 600 psig, or up to 500 psig, or up to 450 psig, or up to 400 psig, or up to 350 psig or up to 300 psig. Alternatively, the pressure can be at least 100 kPa, or at least 150 kPa, or at least 200 kPa, or at least 500 kPa, or at least 1,000 kPa up to 7 MPa, or up to 4 MPa, or up to 3.5 MPa, or up to 3 MPa.

After the addition step described above wherein the aqueous solution is combined or mixed with the multi-PC melt to form the MAS mixture, the process includes subjecting the MAS mixture to a shearing step at a temperature of above the melt temperature of the at one first polymer component of the multi-PC melt. Accordingly, the MAS mixture is subjected to shear at an elevated temperature above the melt temperature of at least the first polymer component in the multi-PC melt; and at an elevated pressure to keep the water and any other optional liquid additives present in the aqueous solution or MAS mixture in a flowable liquid form as the MAS mixture is being subjected to shearing.

In some embodiments, for example, the temperature applied to the MAS mixture (i.e., the composition mixture of multi-PC melt and aqueous liquid solution) during the shearing step can be the same as the melting step and addition step temperatures described above. For example, the shearing step of the multi-PC melt in the presence of the aqueous liquid solution can be carried out at a temperature above the melt temperature of at least one polymer component (e.g., at least the first polymer component) of the multi-PC melt which consists of at least two or more polymer components that have multiple melting temperature peaks, glass transition temperature peaks or combinations thereof, and up to 280° C. depending upon the first polymer component. Accordingly, in some embodiments, the temperature used during the shearing step can be, for example, from 60° C. to 280° C. in one general embodiment; from 90° C. to 190° C. in another embodiment; and from 140° C. to 170° C. in still another embodiment. In other embodiments, the shearing step temperature can be at least 105° C., or at least 110° C., or at least 130° C., or at least 150° C., or at least 160° C. up to 280° C., or up to 250° C., or up to 240° C., or up to 230° C., or up to 220° C., or up to 210° C., or up to 200° C.

Also, in some embodiments, for example, the pressure applied to the MAS mixture during the shearing step can be the same as the melting step and addition step pressures.

Accordingly, in some embodiments, the pressure used during the shearing step can be, for example, at least 15 psig, or at least 20 psig, or at least 50 psig, or at least 80 psig, or at least 100 psig, or at least 150 psig, or at least 200 psig up to 1000 psig, or up 600 psig, or up to 500 psig, or up to 450 psig, or up to 400 psig, or up to 350 psig or up to 300 psig. Alternatively, the pressure can be at least 100 kPa, or at least 150 kPa, or at least 200 kPa, or at least 500 kPa, or at least 1,000 kPa up to 7 MPa, or up to 4 MPa, or up to 3.5 MPa, or up to 3 MPa.

The shearing of the MAS mixture occurs with the multi-PC melt in melt form. The amount of shear should be sufficient to break the multiple polymer components in the multi-PC melt into small particles in the presence of the aqueous solution. For example, the specific mechanical energy input into the MAS mixture can be at least 0.01 kilowatt hours per kilogram (kWh/KG), or at least 0.05 kWh/KG or at least 0.08 kWh/KG. The specific mechanical energy can be up to 0.5 kWh/KG, or up to 0.4 kWh/KG, or up to 0.3 kWh/KG. In a preferred embodiment, when an extruder system is used to carry out the shearing step (e.g., see the extruder shown as numeral 41 in FIG. 1), the specific mechanical energy for an extruder, can be calculated using the following mathematical equation:

{(rated power of the motor in kilowatts)×[(actual torque applied)/(maximum torque for the extruder)]×[(screw speed)/(maximum screw speed for the extruder)]×efficiency of the extruder system}/[rate of material throughput in extruder (kilograms per hour)].

The efficiency of the extruder system is the efficiency of transferring the motor energy into the multi-PC melt. For example, certain energy losses may occur for example in gear boxes or other mechanical features.

In some embodiments, the MAS mixture stream is exposed to shear for a period of time of less than (<) 20 min in one general embodiment; <10 min in another embodiment; and <6 min in still another embodiment. In other embodiments the shearing of MAS mixture stream can be is carried out for a period of time of from 1 min to 30 min in one general embodiment; from 2 min to 12 min in another embodiment; and from 4 min to 10 min in still another embodiment.

During the step of shearing the MAS mixture (i.e., the multi-PC melt in contact with the pressurized aqueous solution), a dispersion, particles, or strands of at least one polymer component in the multi-PC melt (e.g., the at least one first polymer component) are formed with an enriched polymer concentration.

During shearing step, the aqueous solution is present in the MAS mixture at a concentration of from 1 wt % to 50 wt % in one general embodiment; from 2.5 wt % to 35 wt % in another embodiment; and from 5 wt % to 25 wt % in still another embodiment.

Any or all of the steps of the process can be carried out as a batch process using conventional batch equipment in one embodiment; or the process can be carried out as a continuous process using conventional continuous equipment in another embodiment. In a preferred embodiment, the shearing step is conducted using an extruder on a continuous basis.

The shearing of the MAS mixture (i.e., the mixture comprising the multi-PC melt and aqueous solution; including any other optional ingredients), at elevated temperature and pressure can occur in any device that can provide, shear, pressure control and temperature control. The device can be, for example, a conventional extruder system such as an extruder having a shear zone and an extraction zone. Other conventional auxiliary equipment known to those skilled in the art of extrusion can include, for example, an extruder coupled to a back pressure regulator, a melt pump, or a gear pump.

In one embodiment, and with reference to FIG. 1 again, there is shown an extruder system 40 including, for example, a single twin-screw extruder to carry out the melting, shearing and extraction steps of the present invention process. However, the extruder system can include one or more extruders to provide the melting, shearing and extraction steps. Different types of extruders such a single-screw extruder, a twin-screw extruder, and combinations thereof can be used. In a preferred embodiment, a single twin-screw extruder is used to carry out the process as shown in FIG. 1.

In some embodiments, before using an extruder to generate a multi-PC melt sourced by melting multi-PC thermoplastic articles or materials to form the multi-PC melt, the multi-PC thermoplastic articles or materials are provided in solid form such as in the form of solid (i.e., non-melted) pellets, powder, or flakes by processing the multi-PC thermoplastic articles or materials through a densification process such as grinding, shredding, or pelletizing the articles or materials. Then, the solid pellets, powder, or flakes can be fed, for example, from a feed hopper to a feed inlet of the extruder. Additional solid ingredients, e.g., an optional solid surfactant, optional solid compatibilizer, or other desired optional solid materials can also be added with the pellets, powder, or flakes at the feed inlet of the extruder or near the feed inlet of the extruder via a separate different extruder inlet. For example, the other solid ingredients can be blended or combined with the solid pellets, powder, or flakes and the combined materials can be added to the feed inlet of the extruder; or the other solid ingredients can be added to the extruder separately from the solid pellets, powder, or flakes through a separate different extruder inlet.

In some embodiments, the multi-PC thermoplastic articles or materials are melted to form a multi-PC melt in the first portion (melting zone) of the extruder; and the aqueous solution and any other desired ingredients can be substantially simultaneously fed to the extruder to contact the multi-PC melt. Alternatively, a multi-PC melt can be first prepared separately, and the other desired ingredients can be fed to the extruder to contact the multi-PC melt before or after the multi-PC melt is formed. In another embodiment, for example, at least two extruders can be used to carry out the process including a first extruder and a second extruder. For example, the multi-PC melt can be formed in the first extruder; and then the multi-PC melt can be fed into another different second extruder coupled with the first extruder. The aqueous solution and any other desired ingredients can be substantially simultaneously, or separately, fed to the second extruder with the multi-PC melt. The multi-PC melt (with any other desired ingredients that have been added) can then be delivered to a shear zone and an extraction zone of, for example, either the second extruder when two extruders are used; or to the shear zone and extraction zone portions of a single extruder.

The temperature setting for the first portion (melting zone) of the extruder (or for a prior first extruder feeding into the shear and extraction zone of a second extruder) is sufficient to convert the densified multi-PC thermoplastic articles or materials into a melt. For example, the temperature can be at least 105° C., or at least 110° C., or at least 130° C., or at least 150° C., or at least 160° C. up to 300°

C., or up to 280° C., or up to 250° C., or up to 240° C., or up to 230° C., or up to 220° C., or up to 210° C., or up to 200° C.

The temperature setting in the shear and extraction zone can be the same as in the first portion of the extruder or can be lower but still above the melt temperature. For a small-scale extruder, the temperature can be substantially the same through the initial portion of the extruder and the shear/extraction zones. The temperature profile of the extruder system can include any number of heating zones for heating up the feed material at the beginning of the extruder and any number of cooling zones for cooling down the feed material after the shear and extraction zones. For example, one or more initial zones may be at a temperature of 25° C. to 100° C., increasing in increments until reaching the desired melt and/or shear and extraction temperature. Similarly, optional cool down zone(s) may be from about 100° C. to 25° C. in increments as desired. The sheared mixture can be further diluted with additional water or other ingredients added via optional extruder inlets from optional reservoirs in an optional final zone after zone of the extruder for cooling and/or dilution.

In some embodiments, the pressure applied to the MAS mixture during the shearing step (in the shearing zone of the extruder) can be at least 15 psig, or at least 20 psig, or at least 50 psig, or at least 80 psig, or at least 100 psig, or at least 150 psig, or at least 200 psig up to 1,000 psig, or up 600 psig, or up to 500 psig, or up to 450 psig, or up to 400 psig, or up to 350 psig or up to 300 psig. Alternatively, the pressure can be at least 100 kPa, or at least 150 kPa, or at least 200 kPa, or at least 500 kPa, or at least 1,000 kPa up to 7 MPa, or up to 4 MPa, or up to 3.5 MPa, or up to 3 MPa.

In other embodiments, additional ingredient(s) in liquid or solid form can be added to the extruder from one or more reservoirs through one or more extruder inlets via one or more feed hoppers or pumps. While the inlet of the extruder can be at the beginning of the shear and extraction zone, optionally, for example, the aqueous solution can be added from a reservoir up-stream from the shear and extraction zones at a portion of the extruder after the multi-PC thermoplastic articles or materials have been melted to form the multi-PC melt. In other embodiments, the liquid ingredients of the aqueous solution and any desired optional components such as an optional compatibilizer, optional cleaning agent, optional base, can also can be provided from separate reserve vessels through separate pumps. Any suitable pump may be used. For example, a pump that provides a flow of about 150 cubic centimeters per minute (cc/min) at a pressure of 240 bar (24 MPa) can be used to provide the ingredients to the extruder. As another example, a liquid injection pump provides a flow of 300 cc/min at 200 bar (20 MPa) or 600 cc/min at 133 bar (13.3 MPa). In another embodiment, the liquid ingredients can optionally be preheated in a preheater.

Generally, to maintain pressure in the shear and extraction zone, there would be no venting from the extruder. However, in a system with two extruders in series—one extruder to convert the multi-PC thermoplastic articles or materials to a melt and a second extruder to shear the combination of the MAS mixture (i.e., the multi-PC melt and the aqueous solution; and any optional components) —or in a long extruder system there could be venting in the portion of the system where the thermoplastic polymer blend resin is being converted into a melt. In addition, in a long system, there could be venting toward the end of the final zone for cooling—e.g., to dewater the combination to some extent.

After the shearing step of the process and formation of the dispersion, particles or strands in the MAS mixture, a separation step is used in the process to separate the dispersion, particles or strands of the at least one first polymer component having an enriched first polymer component concentration, from the other components in the MAS mixture including, for example, the water, the at least one dispersing agent, the at least second polymer component, any remaining thermoplastic polymer resin components, and/or any remaining optional components. For example, the polymer (e.g., PE) dispersion, particles or strands are physically separated from the MAS mixture. In a preferred embodiment, the separation step may be carried out via a conventional process such as a floatation process, a centrifugal separation process, a filtration process, or a flocculation process.

The first polymer component of the multi-PC melt formed after shearing the MAS mixture, viz, the enriched first polymer component stream formed and present in the MAS mixture after shearing, can be separated from the other components present in the MAS mixture; and subsequently the enriched polymer component stream can be collected/recovered. The other components present in the MAS mixture can include, for example, water, the second polymer component, and other remaining resin components. Methods for separating and collecting the desired enriched polymer component stream include, for example: (1) a process that first allows the desired enriched polymer component stream to float to the top of the MAS mixture, wherein the desired enriched polymer component stream is generally a solid material and in the form of large particles, and then collecting the material by skimming the top material layer off the top of the MAS mixture or filtering the top material layer from the MAS mixture; (2) a process wherein the material is first strained to collect small particles of material and then agglomerating the small particles to form larger particles (agglomerations) which can be collected using a filtration process: (3) a centrifugation process for separating the material through centrifugal forces in either a continuous or batch manner; and/or (4) an extruder process for separating the material in an extruder by diverting the water or other liquids from the material in the extruder. The separated enriched polymer component stream (e.g., the first polymer component stream having an enriched first polymer concentration) can be dried to form a powder or can be processed through a pelletizer to form a plurality of pellets. The powder can be further sieved to remove contaminants or alternate polymers of larger or smaller sizes.

In general, the separation step in some embodiments, to separate the dispersion, particles or strands of the at least one first polymer component having an enriched first polymer component concentration, from the other components in the MAS mixture can be carried out with a short period of time such as in a period of time of <20 min in one general embodiment; <10 min in another embodiment; and <6 min in still another embodiment. In other embodiments the separation step can be is carried out for a period of time of from 1 min to 30 min in one general embodiment; from 2 min to 12 min in another embodiment; and from 4 to 10 min in still another embodiment.

The process includes a step of recovering the separated dispersion, particles or strands of the at least one first polymer component having an enriched first polymer component concentration formed in the shearing step of the process and separated in the separating step of the process. For example, in one embodiment, the resultant separated dispersion, particles or strands formed in the process are subjected to a drying step to remove any extraneous water present in the dispersion, particles or strands; and to make it easier to further process the dried dispersion, particles or strands such as subjecting the dried dispersion, particles or strands to a recycling process.

In some embodiments, the process may include one or more further processing steps such as step (h) subjecting the recovered stream of step (g) to drying; pelletizing; de-volatilization extrusion; steam stripping; co-stripping; recycling; or combinations thereof.

One of the advantages of the present invention process is that the steps of the process can be carried out by several conventional processes and equipment known in the art. In addition, another advantage of the process is that a delamination process or delamination step is not required prior to carrying out the separation step using the process. Therefore, the process is less complicated than a delamination process or dissolution process.

Some of the other advantages of the separation/recovery process include, for example: (1) the process enables enrichment of a desired single-polymer component stream; (2) the process enables separation of the desired enriched single-polymer component stream from other components remaining in the melt; (3) the desired separated enriched single-polymer component stream can be passed through further processing functions; (4) the desired separated enriched single polymer component stream can be recycled; (5) the process provides additional optional formulating steps such as blending the desired separated single polymer component stream with other components including, for example, virgin resin, odor scavenger additives, antioxidants, UV stabilizers, inorganic fillers, slip agents, anti-block agents, and the like; (6) the aqueous liquid solution mixture used in the process to treat the multi-PC melt is a waterborne formulation (i.e., solvent-free) as opposed to a solvent-borne formulation; and the waterborne formulation of the process beneficially reduces environmental impact concerns; and (7) the process provides the option of using a continuous extruder-based process which has the advantage of enabling separation on a shorter time scale (e.g., from 1 min to <1 hour [hr]) compared to other types of processes such as batch diffusion-based processes which can take, for example, up to several hours (e.g., 1 hr to 15 hr) to enable separation.

The separated, collected, and recovered first polymer component of the multi-PC melt in the form of a dispersion, particles or strands of first polymer component formed during the shear step of the process and recovered in the recovery step of the process comprises a first polymer component stream that is enriched in the desired first polymer component and recovered for further processing such as processing the first polymer component through a recycling process. By "enriched", "enrichment" or "enriching", it is meant that the concentration of at least one first polymer component is increased from a first level concentration to a second level concentration higher than the first level concentration. For example, the concentration of the at least one first polymer component of a multi-PC melt, before the multi-PC melt is passed through the process, is at a first level; and then the first level concentration increases to a second level concentration after the multi-PC melt is passed through the process.

In general, the first polymer component that has not been processed as described herein to produce first polymer component stream in the form of a dispersion, particles or strands of the multi-PC thermoplastic polymer blend is enriched in the amount of at least 1 wt % in one embodiment and at least 10 wt % in another embodiment. In other embodiments, the enriched first polymer component stream can be enriched from 50 wt % to 100 wt % in one embodiment, from 90 wt % to 99 wt % in another embodiment, and from 50 wt % to 90 wt % in still another embodiment.

In some embodiments, the average particle size of the recovered and collected enriched first polymer component, if collected from dispersion or particles, can be from at least 0.1 μm, at least 1 μm, at least 5 μm or at least 10 μm. The average particle size can be up to 600 μm, up to 400 μm, up to 200 μm, or up to 150 μm. The particle size can be measured by using standard particle size measurement instruments such as Beckman Coulter particle size analyzer. If strands of the enriched first polymer component are collected, the size of the strands can be readily measured by other conventional size measuring equipment known to those skilled in the art for measuring the length (L) and diameter (D) of the strands as a ratio of L/D.

In some embodiments, after the recovery step (g) of the process, the recovered separated dispersion, particles or strands of the at least one first polymer component stream having an enriched first polymer component concentration of step (f), can optionally be formulated or blended with one or more components selected from the group consisting of virgin resin, odor scavenger additives, antioxidants, UV stabilizers, inorganic fillers, and combinations thereof.

In some embodiments, after the recovery step (g) of the process, the process may optionally include a further processing step (h). For example, the recovered stream of step (g) can be subjected to one or more further steps including drying; pelletizing; de-volatilization extrusion; steam stripping; co-stripping; recycling; or combinations thereof. In one preferred embodiment, the enriched first polymer component stream in the form of a dispersion, particles or strands of the multi-PC melt described above, after being separated and recovered from the non-enriched second polymer of the multi-PC melt, is passed to a recycling system and beneficially subjected to a recycle process. For example, the dispersion, particles or strands of the desired separated polymer component stream collected and recovered in step (g) of the process above; can be fed to the recycling system to form a recycle material (recyclate) from the dispersion, particles or strands. Then, the recycled material produced from the dispersion, particles or strands can be used to manufacture another new and different article from the recycled material, i.e., the recyclate material. For example, a multilayer packaging, film, or article made of layers of different thermoplastic polymers can be processed through the process; and then the dispersion, particles or strands made in accordance with the process can be used to manufacture a new different packaging, film or article which can include monolayer or multilayer new products. In general, the process for reusing or recycling the dispersion, particles or strands are conventional processes known to those skilled in the art of recycling. The above recycling process is useful and desired to reduce the amount of plastic waste for the benefit of protecting the environment.

EXAMPLES

The following Inventive Examples (Inv. Ex.) and Comparative Examples (Comp. Ex.) (collectively, "the Examples") are presented herein to further illustrate the features of the present invention process but are not intended to be construed, either explicitly or by implication, as limiting the scope of the claims. The Inventive Examples are identified by Arabic numerals and the Comparative Examples are represented by letters of the alphabet. The following experiments analyze the performance of embodiments of compositions described herein. Unless otherwise stated all parts and percentages are by weight on a total weight basis.

The raw materials used in the Examples are described in Table I.

TABLE I

| Raw Materials | | |
|---|---|---|
| Ingredient | Brief Description | Supplier |
| DOWLEX ™ 2035G | Linear low density polyethylene (LLDPE) resin | The Dow Chemical Company (Dow) |
| DOW ™ DMDA-8940-NT-7 | High density polyethylene (HDPE) resin | Dow |
| DOW ™ DMDA-8907-NT-7 | High density polyethylene (HDPE) resin | Dow |
| Braskem PP 6D43 | Polypropylene (PP) random copolymer | Braskem |
| ENGAGE ™ 8411 | Polyolefin elastomer | Dow |
| Silver Duralar | Metallized polyester film | Grafix |
| PRIMACOR ™ 5980i | Ethylene acrylic acid copolymer dispersing agent | SK |
| Pluronic F-108 | Ethylene oxide-propylene oxide (EO-PO) copolymer dispersing agent | BASF |
| Licocene 431 | Maleic anhydride (MAH)-grafted polyethylene (PE) wax compatibilizer | Clariant |

The following polymers and polymer blends are used in the Examples: (1) A packaging material labeled PA/PE used for packaging pet food: a 5-layer PE/PA film consisting of LDPE at 25.8%, LLDPE at 60%, a PA at 7.8%, and an LLDPE tie layer at 6.4%; (2) A pouch packaging material labeled PET/PE: a PET PE film structure including, for example, LDPE at 23.7%, LLDPE at 55.3%, and PET at 21%; (3) A metallized Polyester PE labeled m-PET/PE including for example, 90% DOWLEX™ 2035G: and 10% Silver Dura-Lar; (4) A 50/50 blend of, for example, HDPE DMDA-8940-NT-7; and HDPE DMDA-8907-NT-7 labeled HDPE 8940 and HDPE 8907 respectively; (5) A 50/50 blend of Braskem PP 6D43 labeled PP; and HDPE DMDA 8940-NT-7 labeled HDPE 8940 and (6) A 50/50 blend of Engage 8411 and HDPE DMDA 8940-NT-7 labeled HDPE 8940.

The blends are compounded in a twin screw extruder into pellets using standard processing techniques prior to feeding into the disclosed shearing process.

The following dispersing agents are used in the Examples: (1) PRIMACOR™ 5980i (ethylene acrylic acid copolymer, 20 wt % comonomer, density=0.958 g/cm$^3$, melt flow index=300 g/10 min, melting point=77.2° C. from SK Global); and (2) Pluronic™ F-108 (ethylene oxide/propylene oxide copolymer, melting point of 60° C., number average molecular weight (Mn)=14,600, from BASF).

A base is also used in the Examples and generally can be any base material. For instance, in the Examples, a potassium hydroxide (30% in water) base is used.

A compatibilizer is used in the Examples and generally can be any compatibilizer material. For instance, in the Examples, a compatibilizer, Licocene 431 (commercially available from Clamant) is used.

General Procedure for Carrying Out Trials

The trials completed for the Examples are performed on a 12-zone 25-millimeter (mm) Berstorff twin screw extruder. The multi-PC composition feed is delivered to the system as a pellet or flake through a large Schenk feeder that dropped into the feed throat of the extruder. Other solids such as the dispersing agent or optional additives are delivered as a pellet or powder using a KQX K-tron feeder that also dropped into the feed throat of the extruder. The water or other liquid components are delivered via a 500D ISCO pump through an injector. Additional water is delivered to the extruder via a large Hydracell pump through an injector further down the extruder.

The resulting composition of the polymer dispersions (Dispersion Numbers. 1-5, abbreviated “Disp. 1-5” which make up the inventive examples herein; and Comparative Dispersions A and B, abbreviated “Comp. Disp. A-B”) used in the Examples are described in Table II. The specific mechanical energy was between 0.09 kWh/KG and 0.17 kWh/KG for the dispersion examples General Procedure for Measuring The ΔH ratio and Tm values of the starting material and enriched polymer material are measured using a Q100 DSC (a differential scanning calorimeter, available from TA Instruments, Inc., New Castle, DE). The measurement conditions are from −90° C. to 250° C. at a 10 degrees Centigrade per minute (° C./min) heating rate and after a run for 2 cycles. The results are reported from the second cycle.

General Procedures for Separation Methods

The separation methods used in the Examples for separating the dispersion, particles or strands formed after shearing include, for example, (1) a floatation method or (2) a filtration method described as follows:

(1) Floatation Method

For the floatation method, the resultant material exiting the extruder is collected in a vessel and then the material is allowed to cool and sit for 24 hr in the vessel. During the period that the material cooled, particles float toward the top of the container and repose on the surface of the material. The particles that float to the top of the material are collected using a scoop. The material collected is then washed with water on a Buchner funnel using vacuum filtration. The washed material is then allowed to air dry for 24 hr prior to further characterizing the dry material.

(2) Filtration Method

For the filtration method, the resultant material exiting the extruder is first collected in a vessel. Then. the material is mixed; and the mixture is poured through a mesh filter bag (800 μm mesh size) to isolate the dispersion or small particles from large polymer strands. The large polymer strands remain in the filter bag. The remaining material in the filter bag is allowed to air dry for 72 hr prior to further characterizing the dry material.

As aforementioned, Table II describes the dispersion process used for the various polymer blends. The resulting material, i.e., the dispersion, particles or strands, exiting the extruder is separated and recovered; and then, the resulting material's properties are measured.

Table III describes the enriched PE characterization of the dispersion samples prepared in the Examples.

TABLE II

Dispersion Process for Polymer Blends

| Example No. | Disp. No. | Resin | Rate (grams per minute [g/min]) | Comp. 1 | Rate (g/min) | Comp. 2 | Rate (g/min) | Comp. 3 | Rate (g/min) | Base (30% KOH) (milliliters per minute [mL/min]) | Water (%) | Water Rate (mL/min) | Dilution Water Rate (mL/min) | Temp. (° C.) | Enriched Polymer Form Factor |
|---|---|---|---|---|---|---|---|---|---|---|---|---|---|---|---|
| Inv. Ex. 1 | Disp. 1 | PET/PE | 52.97 | Primacor 5980i | 15.13 | | | | | 7.32 | 25 | 19.6 | 91 | 190 | Large Particles (LP) |
| Inv. Ex. 2 | Disp. 2 | PA/PE | 52.97 | Primacor 5980i | 15.13 | | | | | 7.32 | 25 | 19.6 | 90 | 190 | LP |
| Inv. Ex. 3 | Disp. 3 | m-PET/PE | 60.536 | Primacor 5980i | 15.134 | | | | | 10.98 | 25 | 19.6 | 105 | 190 | LP |
| Inv. Ex. 4 | Disp. 4 | HDPE 8940 | 26.485 | PP | 26.485 | Primacor 5980i | 22.7 | | | 10.98 | 15 | 4.25 | 105 | 160 | Dispersion |
| Inv. Ex. 5 | Disp. 5 | HDPE 8940 | 30.27 | PP | 30.27 | Pluronic F-108 | 7.57 | Licocene 431 | 7.57 | 1.06 | 15 | 12.47 | 90 | 160 | Dispersion |
| Comp. Ex. A | Comp. Disp. A | HDPE 8940 | 30.27 | HDPE 8907 | 30.27 | Primacor 5980i | 15.13 | | | 10.98 | 15 | 4.25 | 105 | 160 | Dispersion (0.6 μm) |
| Comp. Ex. B | Comp. Disp B | HDPE 8940 | 30.27 | ENGAGE 8411 | 30.27 | Primacor 5980i | 15.13 | | | 10.98 | 15 | 4.25 | 105 | 160 | Dispersion (0.8 μm) |

TABLE III

Enriched PE Characterization

| Example No. | Dispersion No. | Separation Method | DSC PE ΔH Area (Starting Material) (%) | DSC PE ΔH Area (After Separation) (%) | Melting Temperature (Tm) 1st Tm (° C.) | Melting Temperature (Tm) 2nd Tm (° C.) |
|---|---|---|---|---|---|---|
| Inv. Ex. 1 | Disp. 1 | Floatation | 91.5 | 98.2 | 116 | 246 |
| Inv. Ex. 2 | Disp. 2 | Floatation | 96.3 | 99.3 | 118 | 191 |
| Inv. Ex. 3 | Disp. 3 | Floatation | 92.4 | 98.5 | 124 | 240 |
| Inv. Ex. 4 | Disp. 4 | Filtration | 74.0 | 99.0 | 128 | 141 |
| Inv. Ex. 5 | Disp. 5 | Filtration | 74.0 | 98.5 | 128 | 141 |
| Comp. Ex. A | Comp. Disp. A | Dispersion (No separation) | 100.0 | 100.0 | 130 | |
| Comp. Ex. B | Comp. Disp. B | Dispersion (No Separation) | 100.0 | 100.0 | 123 | |

The key results from the data in the above Examples are the two melting temperature peaks observed, and the increase in DSC ΔH Area showing the enrichment.

What is claimed is:

1. A process for separating and recovering at least one polymer component from a melt of a multiple number of polymer components comprising the steps of:

(A) shearing a multi-polymer component melt in the presence of a pressurized aqueous solution; wherein the multi-polymer component melt comprises a blend of at least a first polymer component and at least a second polymer component; wherein the multi-polymer component melt has at least two melting temperatures, at least two glass transition temperatures, or a combination thereof; wherein the pressurized aqueous solution comprises an aqueous liquid mixture of:

(i) water, and (ii) at least one dispersing agent;

wherein the shearing of the multi-polymer component melt in contact with the pressurized aqueous solution forms a dispersion, particles, or strands of the at least one first polymer component having an enriched first polymer component concentration; and (B) after the shearing of step (A), isolating the at least first polymer component from the other polymer components of the multi-polymer component melt by separating the dispersion, particles, or strands of the at least one first polymer component having an enriched first polymer component concentration from the water, the at least one dispersing agent, the at least second polymer component, and any remaining thermoplastic polymer.

2. The process of claim 1, wherein the shearing of the multi-polymer component melt of step (A) in contact with the pressurized aqueous solution further forms a dispersion, particles, or strands of the at least one second polymer component having an enriched second polymer component concentration; and wherein in step (B) after the shearing of step (A), comprises the step of isolating the at least second polymer component from the other polymer components of the molten multi-polymer component thermoplastic article by separating the dispersion, particles, or strands of the at least one second polymer component having an enriched second polymer component concentration from the water, the at least one dispersing agent, the at least first polymer component, and any remaining thermoplastic polymer.

3. A process for separating and recovering at least one polymer component from a melt of a multiple number of polymer components comprising the steps of:

(a) providing a multi-polymer component thermoplastic article having at least a first polymer component and at least a second polymer component;

(b) melting the multi-polymer component thermoplastic article to form a melt of the multi-polymer component thermoplastic article; wherein the melt comprises at least a first polymer component melt stream and at least a second polymer component melt stream; wherein the multi-polymer component melt has at least two melting temperatures, at least two glass transition temperatures, or combinations thereof;

(c) providing a pressurized aqueous solution including an aqueous liquid mixture of:

(i) water, and (ii) at least one dispersing agent;

(d) adding the melt of step (b) to the pressurized aqueous solution of step (c);

(e) shearing the multi-polymer component melt of step (b) in the presence of the pressurized aqueous solution of step (c); wherein the shearing of the multi-polymer component melt in contact with the pressurized aqueous solution forms a dispersion, particles, or strands of the at least one first polymer component stream having an enriched first polymer component concentration;

(f) after the shearing of step (e), separating the dispersion, particles or strands of the at least one first polymer component stream having an enriched first polymer component concentration from the water, the at least one dispersing agent, the at least one second polymer component, and any remaining components in the mixture of the multi-polymer component melt and pressurized aqueous solution; and (g) recovering the separated dispersion, particles or strands of step (f).

4. The process of claim 3, wherein the pressurized aqueous solution comprises from 50 weight percent to 99.9 weight percent of the water of component (i) and from 0.5 weight percent to 35 weight percent of the dispersing agent of component (ii) based on total weight of the components in the pressurized aqueous solution.

5. The process of claim 3, wherein the first polymer component of the melt is selected from the group consisting of polyolefins; acrylics; polystyrene; styrene copolymers; polyamides; thermoplastic urethane; thermoplastic silicones; and combination thereof.

6. The process of claim 3, wherein the first polymer component of the melt is a polyolefin; and wherein the polyolefin component has a density of less than 1, a melt index of from 0.5 grams per 10 minutes to 80 grams per 10 minutes, and a melt temperature of from 60° C. to 150° C.

7. The process of claim 3, wherein the pressure during the shearing step (e) is sufficient to maintain the aqueous liquid solution in liquid phase at the use temperature or to keep water present in the aqueous liquid mixture below the boiling point of the water at the temperature of the process during the shearing step (e).

8. The process of claim 3, wherein the shearing of step (e) occurs in at least one extruder.

9. The process of claim 3, wherein specific mechanical energy imparted during shearing of step (e) is at least 0.01 kilowatt-hours per kilogram.

10. The process of claim 3, wherein the pressurized aqueous solution of step (c) includes one or more components selected from the group consisting of a second dispersing agent, a dispersing agent, a compatibilizer, a cleaning agent, a neutralizing agent, and mixtures thereof.

11. The process of claim 3, wherein the shearing step (e) is a batch process or a continuous process.

12. The process of claim 1, wherein the shearing of step (A) occurs in at least one extruder.

13. The process of claim 12, wherein the aqueous solution is introduced into the extruder.

14. The process of claim 8, wherein the aqueous solution is introduced into the extruder.

15. The process of claim 1, wherein the pressure applied during the shearing step is at least 50 psig.

16. The process of claim 3, wherein the pressure applied during the shearing step is at least 50 psig.

17. The process of claim 13, wherein the pressure applied during the shearing step is at least 50 psig.

18. The process of claim 14, wherein the pressure applied during the shearing step is at least 50 psig.

19. The process of claim 1, wherein the dispersing agent is selected from an ethylene oxide/propylene oxide blend, ethylene acrylic acid copolymers, ethylene methacrylic acid copolymers, alkyl ether carboxylates, petroleum sulfonates, sulfonated polyoxyethylenated alcohol, sulfated polyoxyethylenated alcohols, phosphated polyoxyethylenated alcohols, polymeric ethylene oxide/propylene oxide, primary alcohol ethoxylates, secondary alcohol ethoxylates, alkyl glycosides, alkyl glycerides, or combinations thereof.

20. The process of claim 3, wherein the dispersing agent is selected from an ethylene oxide/propylene oxide blend, ethylene acrylic acid copolymers, ethylene methacrylic acid copolymers, alkyl ether carboxylates, petroleum sulfonates, sulfonated polyoxyethylenated alcohol, sulfated polyoxyethylenated alcohols, phosphated polyoxyethylenated alcohols, polymeric ethylene oxide/propylene oxide, primary alcohol ethoxylates, secondary alcohol ethoxylates, alkyl glycosides, alkyl glycerides, or combinations thereof.

* * * * *